`United States Patent Office`

3,630,914
Patented Dec. 28, 1971

---

3,630,914
AQUEOUS GLYCOL-BASED AUTOMOTIVE ANTIFREEZE COOLANT AND CONCENTRATE CONTAINING ANTILEAK ADDITIVE
Robert J. Nankee and Conrad D. Woods, Midland, Mich., assignors to The Dow Chemical Company, Midland, Mich.
No Drawing. Filed July 3, 1969, Ser. No. 839,071
Int. Cl. C09k 3/02, 3/12
U.S. Cl. 252—72                                    4 Claims

ABSTRACT OF THE DISCLOSURE

Small leaks in aqueous systems, e.g., automobile radiators, are stopped by the addition to the aqueous fluid of about 10 to 1000 p.p.m. of particulate cross-linked polyacrylamide, wherein the polyacrylamide particles, in dry form, are predominantly of a size that passes a 50 mesh screen but not a 200 mesh screen.

BACKGROUND OF THE INVENTION

Fibrous particulate materials, such as ground ginger root or nutshells, have been used as antileak additives for automobile engine coolants. Such materials tend to settle out of the fluid, they discolor the fluid, and they must be used in relatively large amounts in order to be effective.

SUMMARY OF THE INVENTION

Small leaks in aqueous heat exchanger fluids such as the cooling systems of internal combustion engines, gas compressors and the like are stopped by the addition to the aqueous coolant of a very small proportion of particulate cross-linked polyacrylamide. Such particulate polymers are readily dispersed in aqueous fluids. They swell enormously therein but do not dissolve, the swollen particles remaining suspended in the fluid. They have little tendency to settle out of the fluid, do not discolor the fluid and do not greatly increase its viscosity.

The cross-linked polyacrylamide may be a copolymer of acrylamide and a cross-linking monomer or it may in addition contain a minor proportion of other comonomers, such as acrylic acid, methacrylic acid and the like. The proportion of cross-linker should be sufficient to render the polymer insoluble in water but not so much as to unduly restrict the swelling of the polymer particles in water. Suitable proportions are usually of the order of 0.005 to 0.5 mole percent, based on the total monomer. Suitable cross-linkers include N,N'-methylenebisacrylamide, vinyl acrylate, divinyl ether, ethylene diacrylate and the like. A preferred cross-linked polymer is partially hydrolyzed polyacrylamide wherein up to about 50% and preferably about 20 to 40% of the acrylamide moieties are hydrolyzed to acrylic acid moieties or an alkali metal salt thereof. The prepaartion of such materials is more fully described in Patent No. 3,247,171, all of the products there disclosed being useful in the present invention.

Polyacrylamide materials suitable for use in the present invention are commercially available under the trade names Gelgard and Norbak.

The amount of polyacrylamide needed in aqueous fluids to stop the ordinary small leaks arising from imperfect welded or soldered joints, worn seals and bushings, cracked tubes and hoses and the like is very small. As little as 10 parts per million by weight is often effective though as much as 0.1% (1000 p.p.m.) may be used. Still larger amounts can be used but show little, if any, improvement in effectiveness while having the undesirable effect of increasing the viscosity of the fluid. The preferred amount is about 25 to 200 p.p.m. because at this level most leaks are stopped but the viscosity and heat transfer properties are not significantly affected.

Since the polyacrylamide is cross-linked, it does not dissolve though it swells greatly in the aqueous fluid. Thus, the individual particles retain their identity. For most effective stoppage of a leak, the swollen particles should be somewhat, but not too much, larger than the hole to be sealed. If too small, they pass through and are lost. If many times larger than the leak, they are unable to penetrate and become wedged in the hole. Accordingly, it has been found that the optimum size of the dry particles is about 50 to 200 standard screen mesh size. Moreover, it is preferable that the material contain a fairly wide range of particle sizes rather than being closely graded to any particular size, thus providing particles of an appropriate size for any ordinary leak that might develop.

The cross-linked polyacrylamide is conveniently prepared by the free radical catalyzed polymerization of the monomer mixture in either aqueous solution or in a suspension of such aqueous solution in an inert immiscible liquid, such as petroleum ether, toluene or other hydrocarbon. Both techniques are well known in the art for polymerization of these or other water-soluble vinyl monomers. The cross-linkers, catalysts and techniques for polymerization and, optionally, partial hydrolysis of the polymers may suitably be any of those disclosed in Patent 3,247,171.

While the suspension polymerization technique can produce directly a polymer product of the desired particle size, it may be desirable to dry the polymer made by any technique and then grind and sift it to get the desired particle size and distribution.

SPECIFIC EMBODIMENT

Example 1

(A) Preparation of the polyacrylamide
(solution technique)

Acrylamide (100 g.) was dissolved in 150 g. of water and the solution was added to a solution of 33 g. of $Na_2CO_3$ in 150 g. of water. The reactor was purged with $N_2$ and 20 mg. of $K_2S_2O_8$ and 70 mg. of tert.-butyl hydroperoxide were added. The temperature was then gradually raised to 50° C. while the charge was continuously stirred. As polymerization progressed (50–55° C.) the solution became too viscous to stir and finally gelled. The gel was heated 3 hr. at 85–90° C. to complete the polymerization and effect partial hydrolysis of the product. The gel was then dried on a drum drier heated with 120 lb. steam. The dry product was ground and screened, the fraction passing 50 mesh and held on 200 mesh screen being used as a leak stop.

The $Na_2CO_3$ used in the above preparation was for the purpose of partially hydrolyzing the polymer. It can be omitted from the recipe to produce unhydrolyzed product. Such product can then be post-hydrolyzed by similar treatment with aqueous alkali or alkali metal carbonate.

(B) The above preparation can be modified in conventional fashion to produce a bead polymer by suspending the aqueous solution of monomer in an immiscible solvent, e.g., xylene, by use of a conventional suspending agent. The size of the beads can be controlled by the amount and kind of suspending agent and by the degree of agitation of the suspension. By this technique, beads of the desired size (50–200 mesh) can be produced directly, thus avoiding the grinding and screening steps.

(C) Evaluation of the polymer

The ASTM D:2570–66T test procedure was used wherein small holes were drilled in the bottom tank of a simulated automobile radiator filled with a 50% aqueous ethylene glycol coolant solution having dispersed therein the stop-leak to be tested. The pre-drilled holes were plugged while the radiator was filled and brought to the desired temperature. The fluid was circulated for 30 minutes before the test by operating the pump. The plugs were then removed from the holes and the time noted until the leak was stopped.

As a standard of comparison, the stop-leak used in new cars by almost all the major U.S. automobile manufacturers sold under the name Tri-Seal by Tri-X Corp., and believed to consist primarily of a mixture of ground ginger root and nutshells was tested in the same way.

TABLE 1
Stop-Leak Tests

| Ex. No. | Stop-Leak Kind* | Conc., percent | Temp., °F. | Leak dia., in. | Time to seal, sec. |
|---|---|---|---|---|---|
| 1 | A | 0.02 | 80 | 0.03 | 2 |
| 2 | A | 0.02 | 80 | .04 | 2 |
| 3 | A | 0.02 | 200 | .03 | 5 |
| 4 | A | 0.02 | 200 | .04 | 5 |
| 5 | B | .20 | 180 | .02 | 9 |
| 6 | B | .07 | 180 | .03 | 45 |

*A—Beads (50-200 mesh) made according to Example 1; B—Tri-Seal.

For commercial purposes, it is convenient and satisfactory to add the stop-leak to the commercial ethylene glycol antifreeze concentrate. This concentrate is then ordinarily diluted with 1-2 volumes of water at the time it is put into the cooling system in which it is to be used. Such a concentrate would suitably consist essentially of ethylene glycol, suitable corrosion inhibitors and about 5 to 500 p.p.m. of stop-leak. In addition it might contain minor amounts of other glycols, water, lubricants, antioxidants, pH indicators and the like.

We claim:
1. An aqueous glycol base automotive antifreeze coolant having dispersed therein 10 to 1000 p.p.m. of insoluble, water-swellable, cross-linked, particulate polyacrylamide wherein up to about 50% of the amide groups may be hydrolyzed to carboxyl groups or alkali metal salts thereof, and wherein the polyacrylamide particles, in dry form, are predominantly of a size that passes a 50 mesh screen but not a 200 mesh screen.
2. A fluid as defined in claim 1 wherein the degree of cross-linking in the polyacrylamide is that produced by the use of 0.005 to 0.5 mole percent of cross-linker, based on total monomers used to make the polymer.
3. The fluid as defined in claim 1 wherein 20 to 40% of the amide groups have been hydrolyzed.
4. A glycol-based antifreeze coolant concentrate consisting essentially of ethylene glycol, corrosion inhibitors, and about 5 to 500 p.p.m. of insoluble, water-swellable, cross-linked particulate polyacrylamide wherein up to about 50% of the amide groups may be hydrolyzed to carboxyl groups or alkali metal salts thereof, and wherein the polyacrylamide particles, in dry form, are predominantly of a size that passes a 50 mesh screen but not a 200 mesh screen.

References Cited

UNITED STATES PATENTS

| 2,264,388 | 12/1941 | Lamprey | 252—72 |
| 3,021,298 | 2/1962 | Rakowitz | 252—8.5 LC X |
| 3,210,310 | 10/1965 | Holbert, et al. | 252—8.5 LC X |
| 3,247,171 | 4/1966 | Walker, et al. | 260—80.3 N |
| 3,282,874 | 11/1966 | Friedrich et al. | 252—72 X |

RICHARD D. LOVERING, Primary Examiner

U.S. Cl. X.R.
106—33; 252—73